US007547103B2

(12) United States Patent
McDowall et al.

(10) Patent No.: US 7,547,103 B2
(45) Date of Patent: *Jun. 16, 2009

(54) LCOS DISPLAY SYSTEM WITH SOFTWARE/FIRMWARE CORRECTION ENABLING USE OF IMPERFECT LCOS CHIPS

(75) Inventors: Ian E. McDowall, Mountain View, CA (US); Mark T. Bolas, Mountain View, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 11/612,805

(22) Filed: Dec. 19, 2006

(65) Prior Publication Data

US 2007/0177106 A1    Aug. 2, 2007

Related U.S. Application Data

(63) Continuation of application No. 10/971,376, filed on Oct. 22, 2004, now Pat. No. 7,150,533.

(51) Int. Cl.
*G03B 21/14*    (2006.01)
*G03B 21/00*    (2006.01)
*G03B 21/20*    (2006.01)
*G03B 21/28*    (2006.01)

(52) U.S. Cl. .................... 353/20; 353/31; 353/99; 353/102

(58) Field of Classification Search .................. 353/20, 353/31, 34, 82, 84, 99, 102; 348/42, 51, 348/54, 57, 58; 349/30, 39; 345/204
See application file for complete search history.

(56) References Cited

U.S. PATENT DOCUMENTS

| 6,437,839 | B1 | 8/2002 | Cacharelis | 349/39 |
| 6,962,414 | B2 | 11/2005 | Roth | 353/20 |
| 2004/0263502 | A1 | 12/2004 | Dallas | 345/204 |

*Primary Examiner*—Melissa J Koval
(74) *Attorney, Agent, or Firm*—K. David Crockett, Esq.; Crockett & Crockett

(57) ABSTRACT

A LCoS projection display system using two LCoS chips and a variable color filter.

5 Claims, 7 Drawing Sheets

LCOS DISPLAY SYSTEM WITH SOFTWARE/FIRMWARE CORRECTION ENABLING USE OF IMPERFECT LCOS CHIPS

This application is a continuation of U.S. application Ser. No. 10/971,376 filed Oct. 22, 2004, now U.S. Pat. No. 7,150,533.

FIELD OF THE INVENTION

The inventions described below relate the field of LCoS displays.

BACKGROUND OF THE INVENTION

Projection displays for large screen televisions and monitors may use LCoS (Liquid Crystal on Silicon) chips to create an image. The image is created by directing light from a powerful lamp onto the surface of a LCoS chip, and operating the LCoS chip to control, with very fine resolution, the polarization of the reflected light, and passing the reflected light through a polarizer onto a display screen. At each pixel of the LCoS chip, the polarization of the reflected light may be changed depending on the state of the pixel. The light reflected by the LCoS chip is directed into a polarizer, and light of proper polarization is passed through a polarizer the screen, while light of improper polarization is reflected away from the screen, thereby differentiating the light and dark pixels in the image. The reflected light then passes through a projection lens to a screen.

A typical LCoS Projector of the prior is illustrated in FIG. 1, which illustrates in schematic form a traditional projector setup 1 utilizing one LCoS chip to create a projected image. In this system, a lamp and reflector assembly 2 provide the powerful light source, producing and directing light beams 3 into integrating rod 4, where light beams 3 are homogenized. Light beams 3 then exit the integrating rod and pass through color wheel 5. Color wheel 5 is rotated by a motor, which is governed by electronics, both not illustrated. The color wheel is thereby controlled so that it causes light beams 3 to pass through a specific color filter at an instant in time, therefore filtering only a specific color of light at that time. Light beams 3, now a certain uniform color (typically red, green or blue), next pass through optics 6.

Optics 6 focuses light beams 3 on polarizing beam splitter 7. Polarizing beam splitter 7 is positioned such that the polarizing surface is at a forty-five degree angle to the optical axis of optics 6. The polarizing beam splitter is also positioned at a forty-five degree angle to display surface 8 of LCoS chip 9. Polarizing beam splitter 7 divides light beams into two components: beams of light that have S polarization and beams of light that have P polarization. The beam splitter does this by reflecting the beams of light that have the opposite polarization than does the polarizing beam splitter and allowing the beams of light that have the same polarization as the polarizing beam splitter to pass through the polarizing beam splitter unaffected. For example, if polarizing beam splitter 7 is an S polarizing beam splitter, then light beams 3 are divided into light beams 10 having P polarization and light beams 11 having S polarization. Light beams 10 reflect off polarizing beam splitter 7 at roughly a ninety degree angle to light beams 3, and project onto LCoS chip 9, while light beams 11 pass through polarizing beam splitter 7. Light beams 11 may either be lost (not used to display an image on a screen), or may be projected back onto LCoS chip 9 through the use of polarization recovery optics (not illustrated).

LCoS chip 9 is controlled by electronics (not illustrated) that govern the state of the pixels on display surface 8 of the LCoS chip. The electronics control the image displayed on display surface 8 by selectively turning pixels on the display surface "on" and "off". If LCoS chip 9 is a monochromatic display (capable of only displaying black or white), the pixels on display surface 8 can only be in an "on" or "off" state. If the chip is not a monochromatic display, that is, the chip can display grayscale, then the pixels on display surface 8 can occupy states between the fully "on" and fully "off" positions.

Light beams 10 then reflect off LCoS chip 9 at a roughly 180 degree angle to the incident light beams, and the state of the polarization of these light beams (originally P polarization) depends on the state of the pixels on display surface 8. For example, LCoS chip 9 may be designed such that light beams that reflect off pixels that are "on" have their polarization state rotated by ninety degrees. Light beams that strike "off" pixels reflect with their polarization state unaffected. Thus, light from light beams 10 that strikes "on" pixels is reflected back from display surface 8 with its polarization rotated from S to P. These light beams, since they now have the same polarization as the polarizing beam splitter, pass through the polarizing beam splitter to projection optics 12, which focus light beams 13 onto display screen 14 (not illustrated). Optics 12 are positioned such that the optical axis of the optics is perpendicular to display surface 8 of LCoS chip 9. Light from light beams 10 that strikes "off" pixels is reflected back from LCoS chip 9 with its polarization unchanged. When these light beams 15 strike polarizing beam splitter 7, the light beams reflect off the polarizing beam splitter at a roughly ninety degree angle to the incident light beams and pass back through optics 6. If LCoS chip 9 is a grayscale-capable chip, then light from light beams 10 may also reflect off partially "on" pixels, and thus undergo a polarization rotation between zero and ninety degrees. The light reflected from partially "on" pixels is partly transmitted through polarizing beam splitter 7 and partly reflected by it.

Through this pixel and light polarization manipulation, images on the LCoS chip are projected onto the screen. "On" pixels in the LCoS chip's image reflect light that passes through the polarizing beam splitter, and thus create a bright area in the projected image. "Off" pixels in the LCoS chip's image reflect light that the polarizing beam splitter blocks from reaching the display screen, creating a dark area in the projected image. Light that reflects off partially "on" pixels is used to create shades between the two extremes; the degree of how "on" the pixel is determines how light the shade is.

Images displayed by LCoS chips are magnified around one hundred times (100×) when they are projected on to a display screen. Therefore, any problems with defect pixels on the LCoS chip are going to be noticeable and annoying to a projector viewer. During the life of the system, it is possible that process defects in the LCoS chip may cause visual defects to appear in the projected image. Pixels may lose the ability to switch completely on and off before a display has reached the end of its lifetime. Some LCoS chips have defects after manufacturing which are not related to lifetime and are simply defects on the chip. Defects may lead to failure of pixels to operate. If a pixel is stuck in a permanent "on" or "off" state, it will appear on the screen as a permanent, non-moving white or black spot, respectively. These defects will cause the projected image to have artifacts that are not part of the intended image. This degrades image quality and is undesirable in an end product. FIGS. 2a and 2b illustrate this degradation of the image displayed to the viewer. In FIG. 2a, the display screen 14 shows an image which includes a black dog, but due to a single pixel on the LCoS chip which is stuck permanently on, a single pixel that should be black is instead illuminated, creating a noticeable visual artifact 16 on the image. In FIG. 2b, the display screen 14 shows an image which includes a white dog, but due to a pixel on the LCoS chip which is stuck permanently off, a single pixel that should be white is not illuminated, creating a noticeable visual artifact 17 on the image. These artifacts appear permanently on the display screen because they derive from physical defects in the LCoS chips. Systems that utilize only one LCoS chip to produce an image or portion of an image have no way to correct or ameliorate the effects that bad, non-functioning pixels have on an image.

SUMMARY

The systems and methods described below mitigate the impact of blemishes and pixel defects in LCoS projection systems. Given that the majority of defects impact only a small area of the display, the system uses a second LCoS chip so that defects on one chip can be hidden algorithmically by the way in which the image is presented on the other. For example, if there is a pixel which is stuck "on" in one LCoS chip, then the system can mitigate its effect by turning off that area in the other LCoS. Note that perfect correspondence between pixels on one LCoS and the pixels on the other LCoS ('pixel-alignment') is not necessary to achieve this effect. The system and method have the added benefit of allowing the use of non-zero-defect LCoS display chips. It also obviates the need for expensive polarization recovery optics in order to utilize the entire projected lamp light.

DETAILED DESCRIPTION OF THE INVENTION

Figure 1:
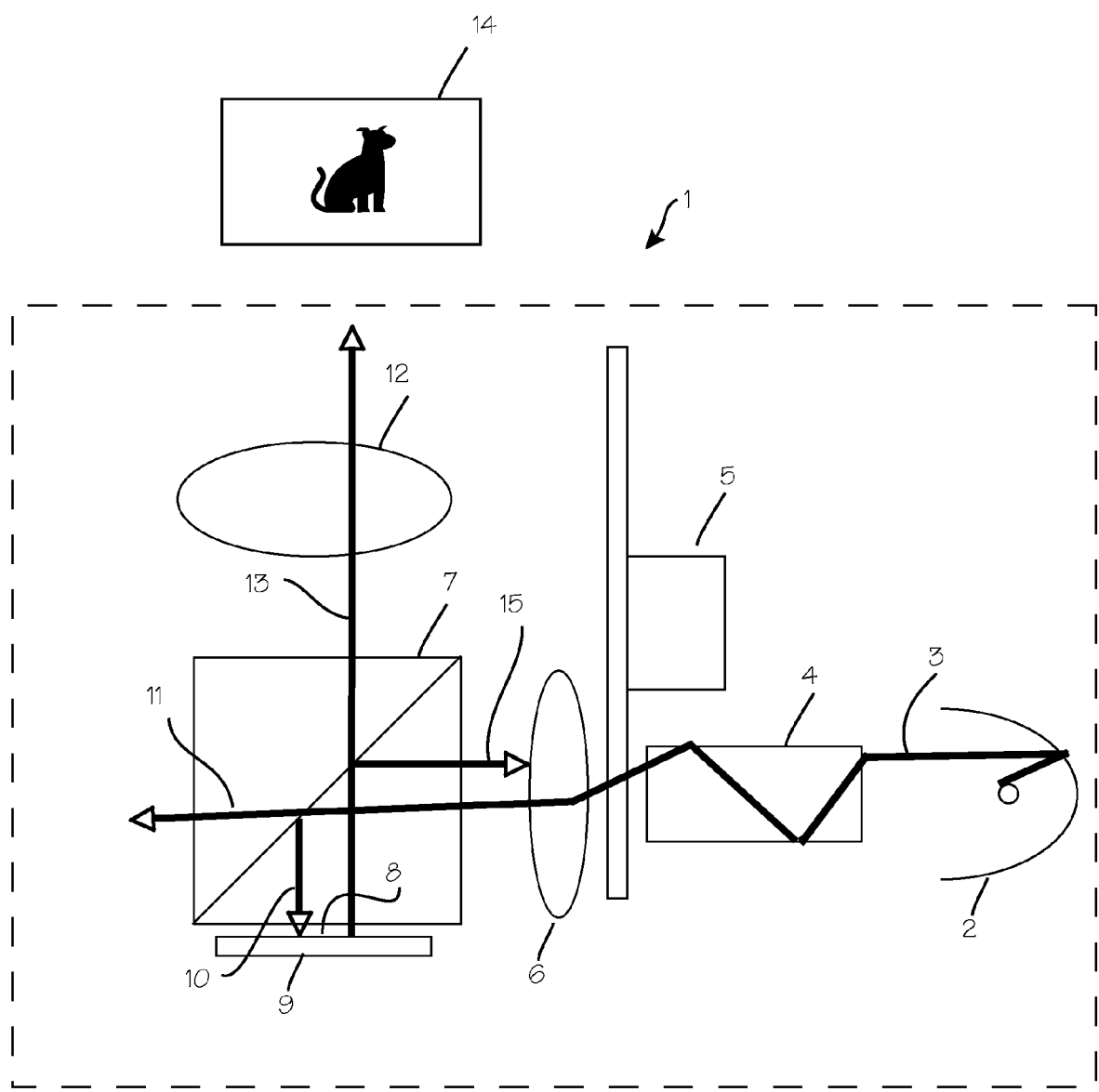
FIG. 1 illustrates a typical LCoS Projector of the prior art, as discussed above.
Figure 3:
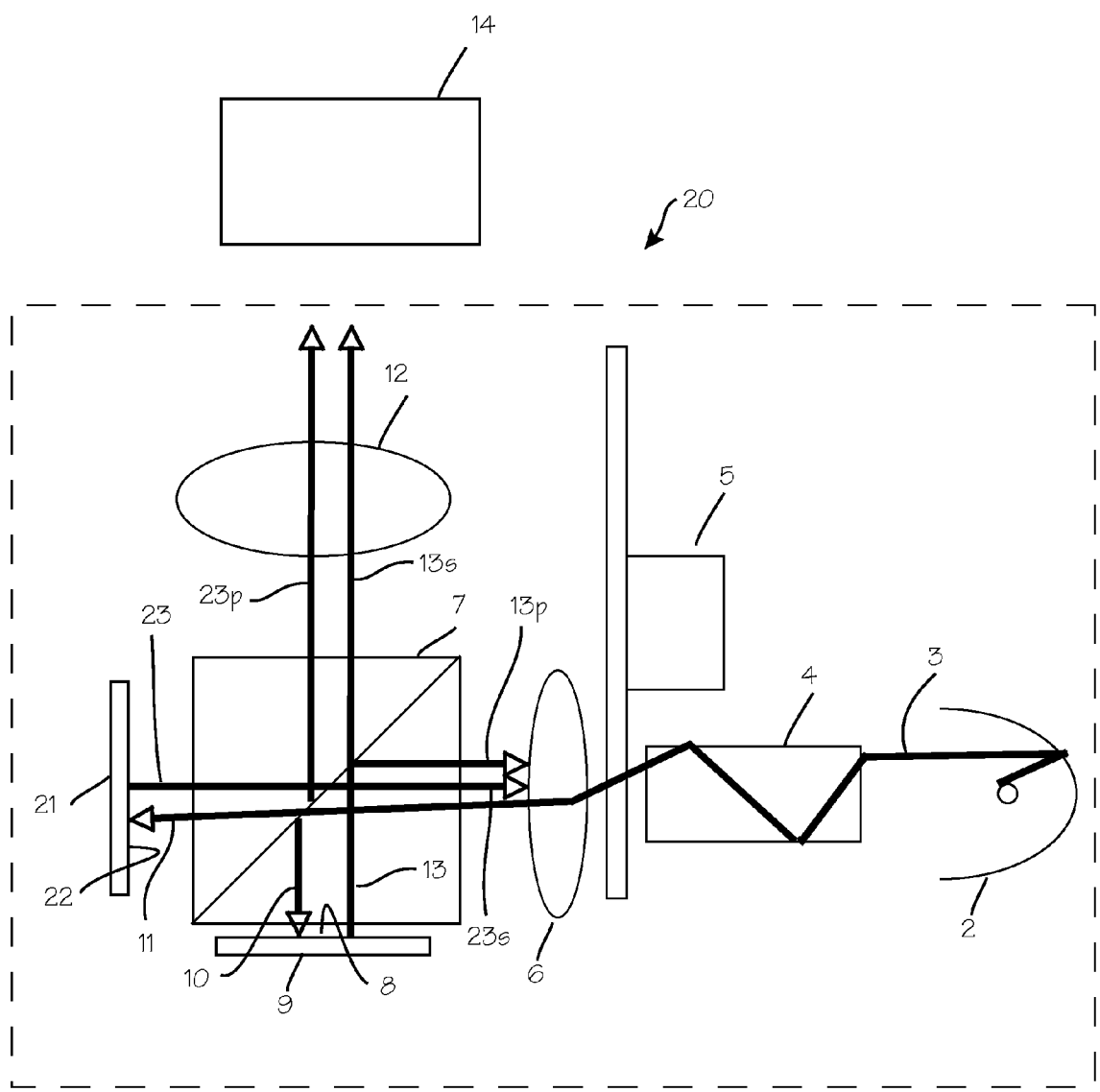
FIG. 3 is a schematic of a LCoS projector system using two LCoS chips to process a single image frame.

FIG. 3 is a schematic of a LCoS projector system 20 using two LCoS chips to process a single image frame. As in FIG. 1, the system includes the light source 2, integrator rod 4, color wheel 5, optics 6 which provide the initial light beams 3 to the remainder of the system, and the beam splitter 7 which controls redirection and passage of light to the various surfaces of the system. The system may be part of a wall-projector, a projection television, a monitor or the like.

The light source comprises a typical lamp and reflector assembly. A typical configuration with a UHP lamp is shown, though any other suitable light source may be used, such as LED assemblies or halogen lamps. The light provided by the light source is not polarized and, generally, not homogenized. The integrating rod serves to homogenize the light provided by the light source. The variable color filter or sequential color displays may be a typical color wheel or an electronically switchable spectral filter (ColorLink's Colorswitch® for example) or similar device capable of presenting color filters in the light path in a sequence correlated to the operation of the LCoS chip surface. The beam splitter is a polarizing beam splitter cube or reflective polarizer. This optical component (either a prism with special coatings on the hypotenuse or a wire grid type polarizing beam splitter) passes one state of linear polarization and reflects the other. Thus the incoming light from the lamp is split into its S and P components by this beam splitter. For the purposes of illustration assume that this polarizing beam splitter is S polarized.

The beam splitter provides light to both the first LCoS chip 9 and a second LCoS chip 21. The beam splitter reflects light of one polarization state orthogonally while permitting light of another polarization state to pass through. Though the beam splitter may reflect light of S or P polarity and pass the other, and either arrangement is suitable.

Each LCoS chip is controlled by a control system, which may be implemented in firmware or software which are programmed to interpret incoming image display data and generate corresponding appropriate control signals to the millions of pixels on the LCoS chip. The image data may include any typical signal, such as broadcast television signal, computer display image data, cable video signals or video equipment output. The electronics control the image displayed on display surfaces 8 and 22 to correspond to the image display data and the desired image display light output from the chip. The LCoS chips are positioned at 90° angles from each other, with the beam splitter disposed such that its reflecting surface is angled 45° from each chip. Referring to the first LCoS chip 9, the beam splitter reflects that portion of the incoming light beam 3 which matches its polarity, resulting in polarized light beam 10p directed toward LCoS 9 and its display surface 8. The reflected polarized light beam 13 reflected by the beam splitter has the sense of the polarization changed, or not, based on the state of the pixel upon which it is incident. For simplicity, we will assume that the light is rotated by 90 degrees or 0 degrees depending on pixel state. Thus, light reflecting which has been rotated by 90 degrees is now polarized in such a way that it will pass through the reflective polarizer 7 and pass through the beam splitter as light beam 13s. This light goes on to exit the system through projection optics 12. Light which was not changed by the first LCoS 9 reflects and goes back towards optics 6, as is represented by light beam 13p.

Referring to the second LCoS chip 21, the beam splitter transmits that portion of the incoming light beam 3 which matches its polarity, resulting in polarized light beam 11s directed toward the second LCoS 21 and its display surface 22. This light beam 11s has the sense of its polarization changed, or not, based on the state of the pixel in the second LCoS upon which it is incident, and is reflected in light beam 23, which includes some P polarized light and some S polarized light. Light reflecting which has been rotated by 90 degrees is now polarized in such a way that it will not pass through the reflective polarizer 7 is reflected as light beam 23p toward the projections optics 12. Light reflecting which has not been rotated is still polarized such that it will pass through the reflective polarizer is represented by light beam 23s.

The LCoS chips, polarizing beam splitter, and optics may be positioned such that light reflecting off of a pixel on display surface 8 perfectly coincides, after going through the polarizing beam splitter and projection optics, with the light reflecting off a pixel in the exact same location on display surface 22 after that light reflects off the polarizing beam splitter and travels through the projection optics (this is referred to hereafter as 'pixel-alignment'). The LCoS chips, polarizing beam splitter, and optics may also be positioned so that light reflecting off corresponding pixels on display surfaces 22 and 8 does not perfectly coincide (non-pixel-aligned).

The polarization state of the light beams reflected by the LCoS chips is controlled by the state of the pixels on the chips' display surfaces. Electronics control the state of the pixels that produce images on the LCoS chip display surfaces by selectively turning pixels on the display surface "on" and "off". If the chips are monochromatic displays, the pixels on display surfaces can only be in an "on" or "off" state; if the displays are not monochromatic, then the pixels on display surfaces can occupy states between the fully "on" and fully "off" positions. The LCoS chips may simultaneously display the same image, or they may display images that differ slightly from, as will be explained below. If light from light beams 10 or 11 strikes an "on" pixel in either of the LCoS chip display surfaces, then the polarization of the reflected light is rotated ninety degrees, to "S" or "P", depending on the original polarization state. If light from the light beams strikes an "off" pixel in either of the LCoS chips, then the polarization of the reflected light remains the same. The polarization state of the light beams reflected by an LCoS chip determines whether or not the reflected light emits into the projection optics or if the light is blocked from reaching the projection optics. If light from either light beams 10 or 11 strike "off" pixels, then reflected light beams 13 and 23 (respectively) have the same polarization state as the incident light beams. In the case of reflected light beam 23, if it reflects off an "off" pixel on LCoS chip 21, then it retains the "S" polarization state. Light beam 23$p$ passes through polarizing beam splitter 7 and out to optics 6, thereby not reaching the projection optics 12. It is effectively blocked from projection optics 12. If reflected light beam 13 reflects off an "off" pixel on LCoS chip 9, then it has a "P" polarization state. Light beam p reflects off polarizing beam splitter 7 at a roughly ninety degree angle to light beam 13 and travels out to optics 6, not transmitting to projection optics 12.

Light from light beams 10 and 11 may also reflect off partially on pixels, and thus undergo a polarization rotation between zero and ninety degrees. The light reflected from partially on pixels is partly transmitted through polarizing beam splitter 7 and partly reflected by it, so a fraction of the light is able to transmit to the projection optics.

Through this pixel and light polarization manipulation, images on the LCoS chips are projected onto the display screen. "On" pixels in the LCoS chips' images reflect light that the polarizing beam splitter directs to the projection optics, and thus creates a bright area in the projected image. "Off" pixels in the LCoS chips' images reflect light that the polarizing beam splitter directs perpendicular to the projection optics, blocking it from the screen, and therefore creating a dark area in the projected image. Light that reflects off partially "on" pixels is used to create shades between the two extremes. The degree of how "on" the pixel is determines how light the shade is, as some of the light reflected by a partially "on" pixel is directed to the projection optics, and some is directed away from the projection optics.

Because only half of the lamp's light output reflects off a given LCoS chip, the projected images from each LCoS chip are only half as bright as an image projecting from a single LCoS chip projector that uses the entire available lamp light. The two images from the dual LCoS chip projector are combined in the same, or very nearly the same, space on the image display screen, however, so the resulting image from dual LCoS chip projector 20 is as bright as an image from a single LCoS chip projector, assuming that both projectors use similar lamps, optics, and reflector systems.

Thus, each pixel of illumination on display screen 14 may be illuminated by two beams of light. Thus, the system may be operated to ensure that every pixel of the display screen is illuminated, when appropriate, by at least one of the LCoS chips. This mitigates the effect of a pixel stuck in the non-transmissive (relative to the beam splitter) state on the first LCoS chip. Thus, the advantage of using two LCoS chips to display identical or nearly identical images on to the same imaging screen is that allows for the potential to eliminate or greatly reduce the loss of image quality caused by defect pixels that are perpetually stuck "on" or "off". Therefore, it is not necessary to build the two LCoS chip display with zero-defect LCoS chips. Also, if a problem with defect pixels on one or both of the LCoS chips arises during the lifetime of the projector, then the projector can be re-programmed to restore projector image quality to nearly original specifications. For example, if the location of a defect pixel on a first LCoS chip is known, then the electronics controlling the second LCoS chip can compensate by increasing or decreasing the brightness of the corresponding pixel on the second LCoS chip (if the LCoS chips are pixel-aligned) or pixels on the second LCoS in the region of the defect pixel on the first LCoS chip. The overlay of a defect pixel with a compensated pixel or pixels renders a combined portion of an image that more accurately matches the intended image. The images from the two LCoS chips are combined by the projection optics so that a viewer watching the imaging screen can only discern one image.

Another advantage of the two LCoS chip projector is that costly polarization recovery optics are not necessary to utilize all the emitted light from the lamp and reflector. Normally these optics are necessary to capture the light that has the same polarization as the polarizing beam splitter and is thus not reflected on to the LCoS chip. Alternatively, if the light output from a single LCoS is sufficient in certain applications, the second LCoS chip may be operated solely to provide compensating illumination in areas which are over or under illuminated by the firth LCoS chip.

The device described above may be embodied in microdisplay LCoS projectors that use three microdisplays (one reflecting red light, one reflecting green light, and one reflecting blue light) and red, green, and blue lamps instead of the single microdisplay and color wheel. In this system, each single color LCoS microdisplay would be replaced with a dual chip LCoS microdisplays described above. Only microdisplays within a particular microdisplay pair (red light, green light, or blue light) would compensate for defect pixels within that pair. For example, microdisplays in the green light microdisplay pair just compensate for defect pixels in the green light microdisplay pair; a green light microdisplay is not used to correct for a defect in a blue light microdisplay. The total output of each single-color dual-chip LCoS display is combined for illumination of the display screen so that the user sees the proper blended image. Nonetheless, where necessary, the system could be operated such that an overly bright light colored pixel could be painted over in a darker color or combination of colors from the remaining color sources.

Figure 2A:
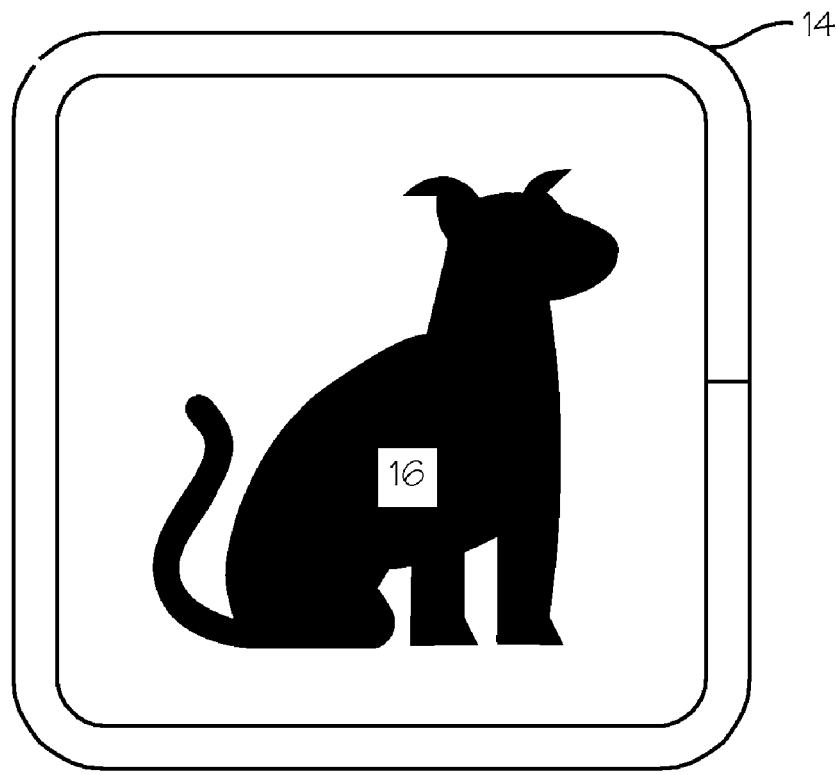
FIGS. 2a and 2b illustrates the image artifact which the system addresses.
Figure 2B:
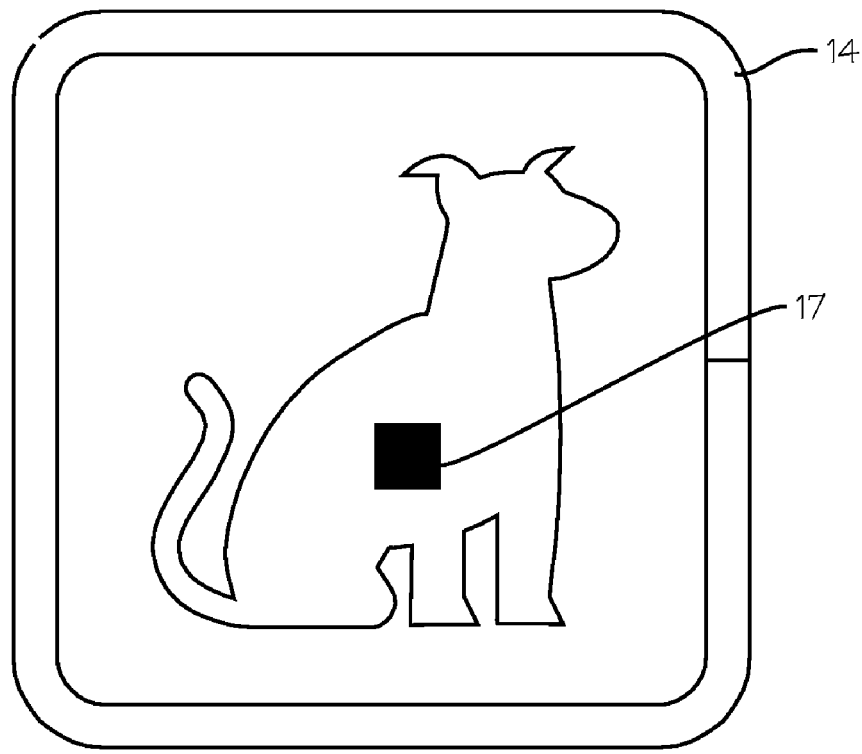
Figure 4:
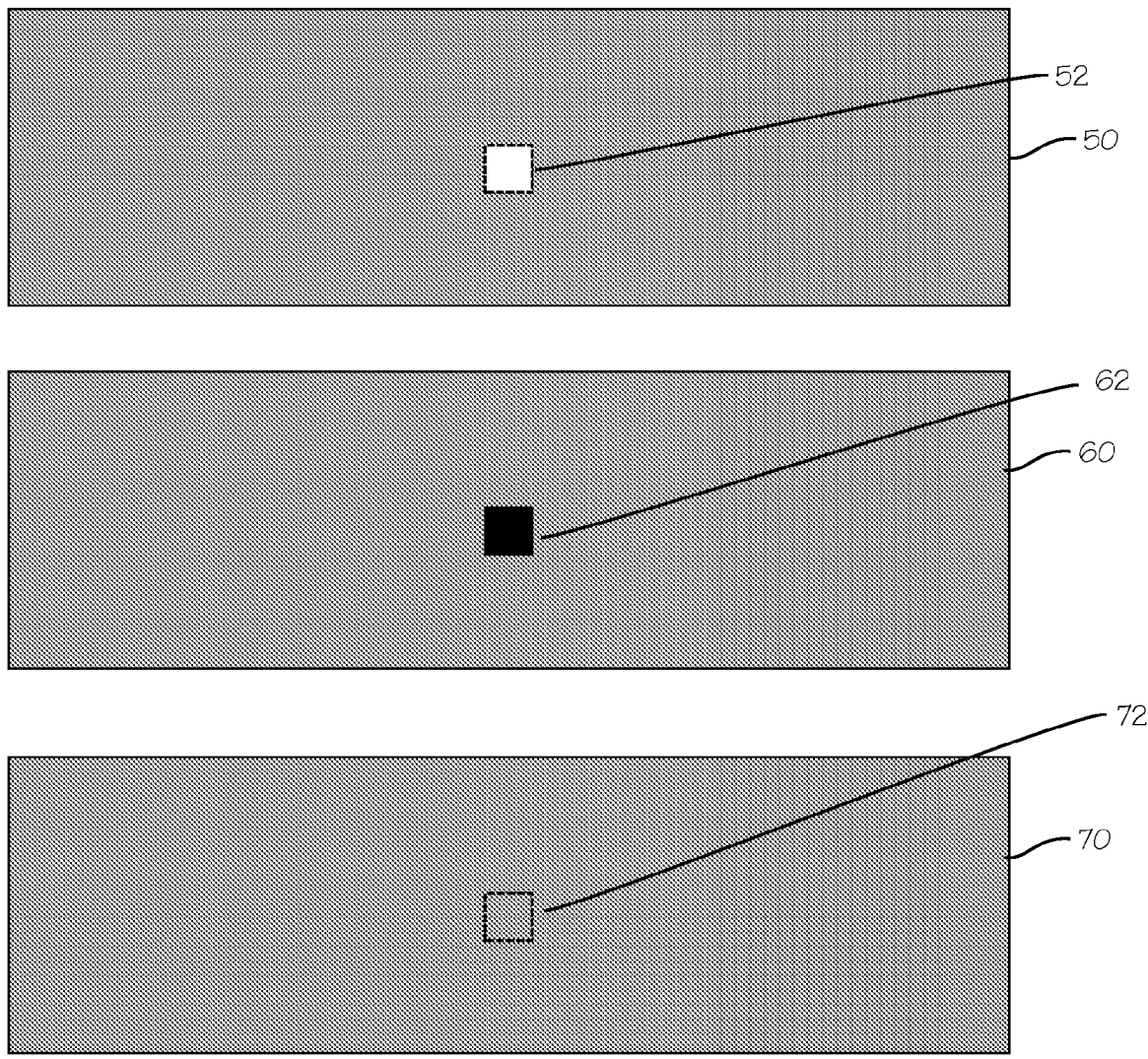
FIG. 4 illustrates the compositing of images from each LCoS chip to compensate for a defect in one of the chips.

Both of the defect pixel related image-display problems illustrated in FIGS. 2*a* and 2*b* (i.e., the over-illumination of under-illumination of a display screen pixel area) can be corrected or at least partially corrected by adjusting the images displayed by the LCoS chips. For example, with reference to FIG. 4 and continuing reference to FIG. 2, suppose that LCoS chip 9 in dual LCoS chip projector 20 has a known defect pixel that is permanently "on" in the center of display surface 8. In this example assume LCoS chip 9 and LCoS chip 21 are pixel-aligned, meaning that the chips are mechanically aligned such that particular pixels of each chip transmit light to a particular pixel of the display screen. The ideal image dual LCoS chip projector 20 attempts to display is a rectangle that is a 50% gray shade, i.e. a gray exactly halfway between 100% black and 100% white. If LCoS chip 9 and LCoS chip 21 were both defect-free, therefore, they would each display a 50% gray rectangle that is half the brightness of the intended final image. Due to the defect pixel on display surface 8, however, LCoS chip 9 can only generate an image that, when projected, looks like image 50, with and unintended bright spot 52. This spot is fully white because all the light reflecting off the defect pixel is projecting on to the image display screen. Were LCoS chip 9 used in a single LCoS chip projector, this bright spot in image 50 would be noticeable on the image display screen. In order to compensate for bright spot 52, the electronics that drive LCoS chip 20 switch the corresponding pixel on display surface 22 completely "off", causing LCoS chip 21 to display an image that, when projected, looks like image 60, with the intentionally completely dark spot 62. Dark spot 62 is 100% black because all the light reflecting off that pixel is being blocked from the image display screen. By projecting both image 60 and image 50 on to the image display screen at the same time, image 70 results. By mixing bright spot 52 with dark spot 62, 50% gray results at spot 72, which is the intended image shade. A viewer would be unable to discern any loss in image quality in this case. For a pixel-aligned dual LCoS chip projector, full shade compensation can occur for 50% of the shade spectrum assuming a one-to-one pixel compensation system is utilized. In this particular scenario, LCoS chip 21 can fully correct for any intended shade brighter than 50% gray, such as 100% white, 25% gray, etc. In this example, the algorithm employed by the LCoS chip 21 electronics simply computes what color to average 100% white with in order to derive the intended, final shade, or a shade that best approximates the desired shad if it is not possible to generate it. If, on the other hand, LCoS chip 9 has a permanently "off" pixel, then LCoS chip 21 can fully correct for shades between 100% black and 50% gray by lightening the corresponding pixel on display surface 22 from the intended, projected shade. Note that in all these examples it is grayscale gradients that are referred to and not color, as the LCoS chips control grayscale and color is adjusted by color wheel 5. Thus, the control system is programmed to operate the first LCoS chip and the second LCoS chip such that each LCoS chip generally provides half the illumination for the brightness of the display indicated in the image data, and for each faulty pixel of one LCoS chip resulting in over or under illumination on the screen display, the control system controls the other LCoS chip to provide compensating lesser or additional illumination from a pixel (in a pixel aligned system) of group of pixels (in a non-pixel aligned system) on other LCoS that correspond to the faulty pixel.

Figure 5:
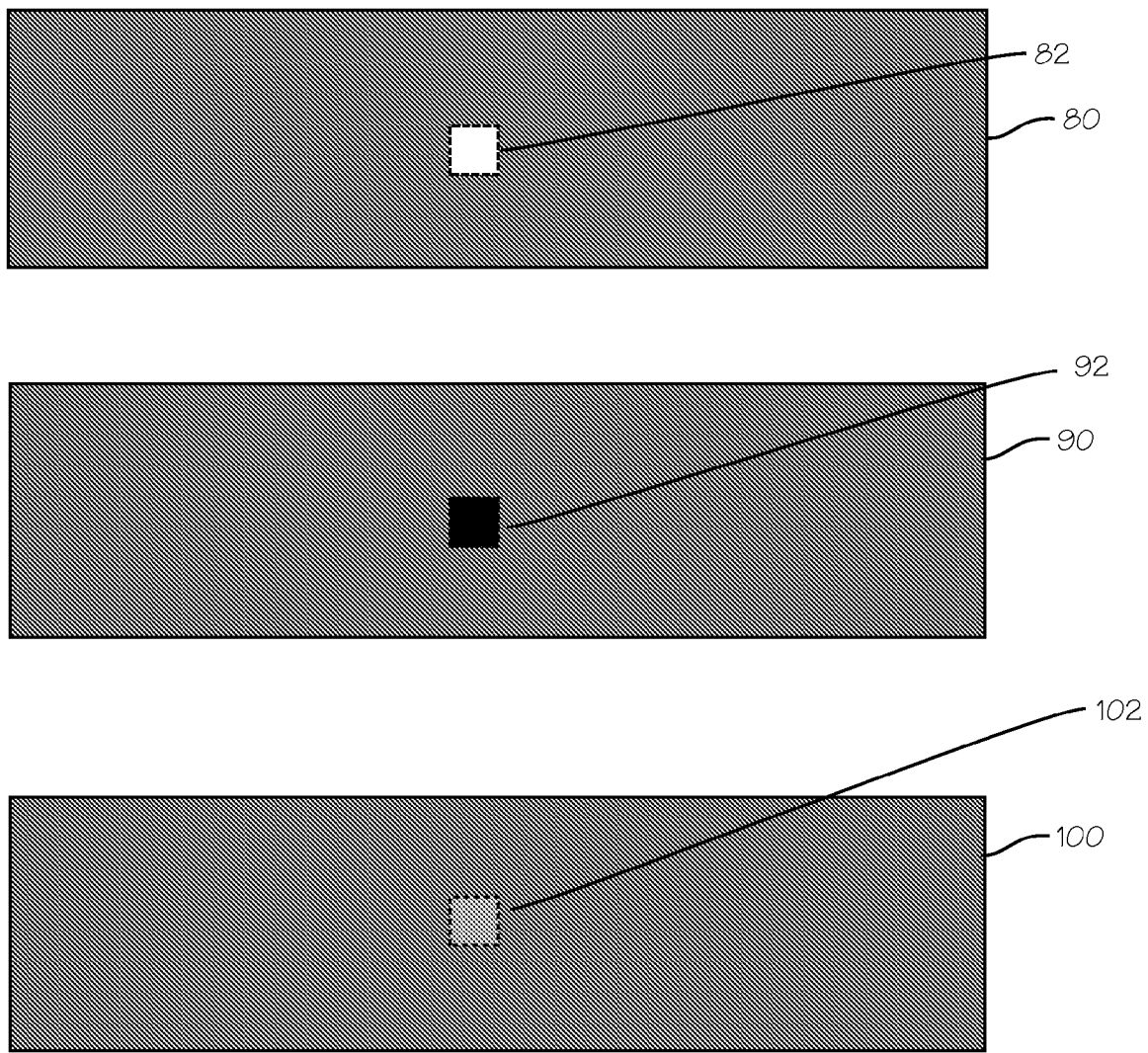
FIG. 5 illustrates the compositing of images from each LCoS chip to compensate for a defect in one of the chips.

In certain image situations a pixel-aligned dual LCoS chip projector cannot fully correct defect-pixel related issues, but it can partially compensate them. With reference to FIG. 5 and continuing reference to FIG. 3, again assume that LCoS chip 9 has a known pixel defect in the center of display surface 8 and that LCoS chip 9 and LCoS chip 21 are pixel-aligned. The defect pixel on display surface 8 is again permanently stuck in the "on" position, resulting in a bright, 100% white spot on any image projected by this chip. If dual LCoS chip projector 20 intends to project an 80% gray rectangular image, LCoS chip 9 would display an image that when projected looks like image 80, with bright spot 82. The electronics that control LCoS chip 21 cannot produce a shade dark enough in the corresponding pixel on display surface 22 to average out to the intended 80% gray; the darkest shade the two pixels can average to is a 50% gray (100% white averaged with 100% black). The electronics that control LCoS chip 21 compensate the maximum possible and cause the corresponding pixel on LCoS chip 21 to switch completely "off". This results in an image that when projected looks like image 90, with dark spot 92. When image 80 and image 90 are projected together, it results in image 100. This image has light spot 102, which is a noticeably lighter shade of gray than the rest of the image. However, this spot is less noticeable than the 100% white spot produced by the defect pixel on LCoS chip 9. In a situation where full pixel-correction is not possible, the algorithm controlling the LCoS chip electronics adjusts the shade of the corresponding pixel in order to best approximate the intended display shade.

Programming the electronics that control the LCoS chips in order to compensate or correct for defect pixels on one or both of the LCoS chips may be done as part of a quality control step when a dual LCoS chip projector is manufactured, as part of routine maintenance of the projector, or the like. The LCoS chips' electronics programming may be performed by technician, or it may be accomplished by automated electronic program.

The above scenarios all discuss pairing an LCoS chip with one defect pixel with an LCoS chip with zero defect pixels, although it is possible to pair an LCoS chip with multiple defect pixels with a zero defect LCoS chip, to pair two LCoS chips with multiple defect pixels, and so forth. As long as there are no corresponding defect pixels on the two LCoS chips, each LCoS chip's electronics can be programmed to compensate for the other LCoS chip's defect pixels.

Figure 6:
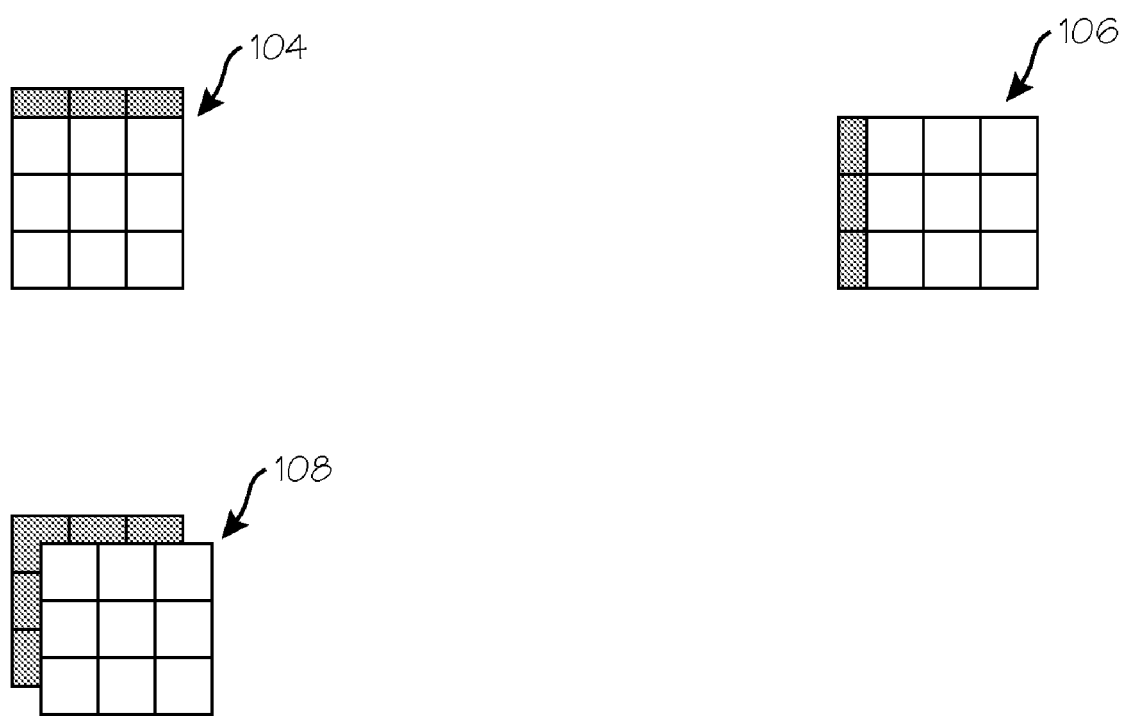
FIG. 6 illustrates the expected arrangements of nearby pixels from each LCoS chip.

Although the previous examples all deal with two pixel-aligned LCoS chips, it is possible to achieve similar pixel-defect compensation with a non-pixel-aligned projector. In this case, light reflecting off a pixel on one LCoS chip might overlap, when projected on to an image display screen, with light from two or four pixels from the other LCoS chip. In the case where two pixels from one LCoS chip overlap one pixel from the other LCoS chip, the misalignment might be in either the vertical or horizontal direction. FIG. 6 illustrates the expected arrangements of nearby pixels from each LCoS chip. If four pixels from one LCoS chip overlap one pixel from the other LCoS chip, then there is misalignment in both the vertical and horizontal direction. FIG. 6 shows representative projected images for all the cases of pixel misalignment; pixel group 104 illustrates vertical misalignment, pixel group 106 illustrates horizontal misalignment, and pixel group 108 illustrates vertical and horizontal misalignment. If the images displayed by any of these misaligned LCoS chips were completely static, the overlay of the two projected images would look shifted and fuzzy. Because of the rapid sampling and refresh rate of LCoS chips, however, the overlay of the slightly shifted images makes the combined, projected images look fairly sharp and defined.

Figure 7:
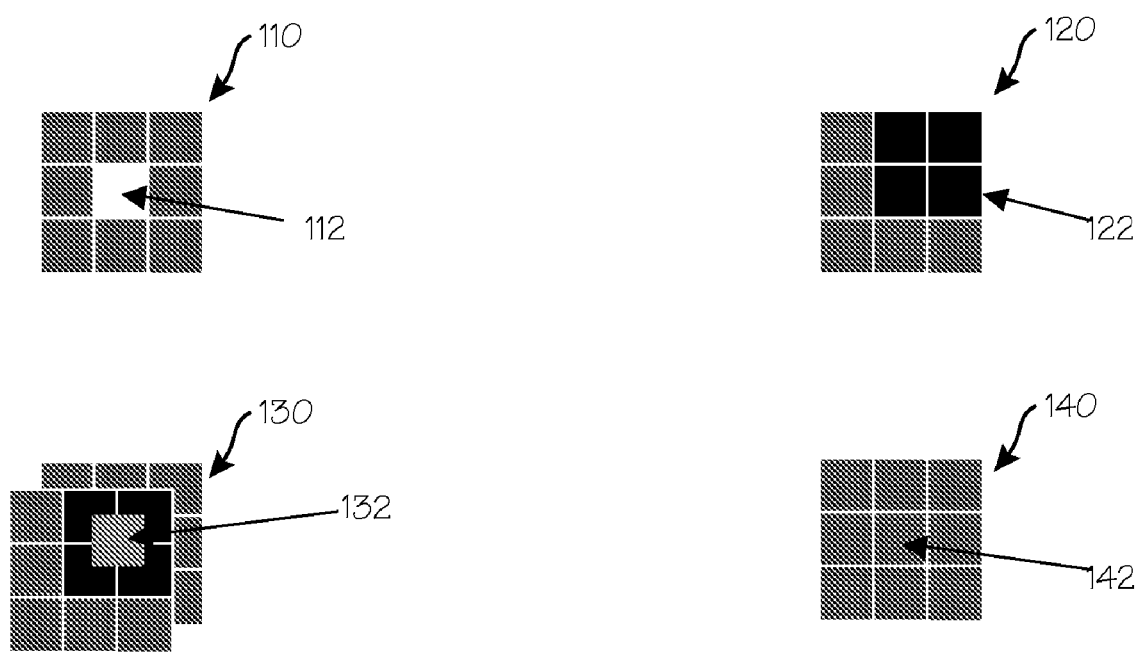
FIG. 7 illustrates the expected arrangements of nearby pixels from each LCoS chip.

Compensating a non-pixel-aligned dual LCoS chip projector is similar in function to compensating a pixel-aligned dual LCoS chip projector. In this case, however, one or more pixels may be used to compensate for a defect pixel. Preferably, more than one pixel is used to compensate for a defect pixel, because a greater number of pixels are available to compensate for a defect pixel, and so a greater degree of ideal image approximation can be achieved. For example, with reference to FIG. 7, suppose a dual LCoS chip projector with vertical and horizontal misalignment is provided. One of the LCoS chips has a known defect pixel in the center of the display surface. The defect pixel is permanently "on", causing images projected from this LCoS chip to contain a fully white spot in the center of the image. If the dual LCoS chip projector intends to project an 80% gray square image, the LCoS chip with a defect pixel would display an image like image 110, with bright spot 112. The electronics that control the non-defective LCoS chip compensate by switching completely "off" the four pixels that, when projected, overlap the defect pixel from the first LCoS chip. The second LCoS chip displays an image that looks like pixel group 120, with dark spot 122 from the four "off" pixels. When pixel group 110 and 120 are projected together, it results in pixel group 130. This image pixel group 130 appears as a light area, which bordered on four sides by dark stripes from dark spot 122, but when averaged out (due to sampling and the like) would look like pixel group 140. A perfectly corrected image is provided. The algorithm for this particular scenario computes which color the four overlapping pixels need to be in order to average out the 100% white defect pixel. Using this technique, where four pixels are used to compensate for one defect pixel, fully compensated shades as dark as 80% gray (or as light as 20% gray, if the defect pixel is permanently "off") can be achieved, versus only 50% for a single-pixel compensated system.

While the preceding examples of pixel-level compensation have all dealt with image-quality problems that stem from defect pixels, the compensation method discussed in this paper can be further expanded to cover cases where dirt, dust, and misalignment over time can cause permanently dark or light spots to form on the projected image.

This methods described above can be extended to cover other pixel-based microdisplay projector systems, such as high temperature polysilicon (HTPS of TFT) or micro-electro mechanical systems (MEMs) projector systems including DLP (digital light processing) projector systems, or D-ILA projector systems, with each such system adapted to uses multiple microdisplays to display redundant images for a particular region of the chromatic scale. For example, two or more gray-scale MEMS microdisplays with defect pixels could be used in a projector system that traditionally uses a single gray-scale MEMS microdisplay with a color wheel, or three pairs of red-green-blue specific HTPS microdisplays with defect pixels could be used in place of three single, red-green-blue specific HTPS microdisplays in an HTPS projector system. In these cases, as with the methods described above, the microdisplays may be either pixel-aligned or non-pixel-aligned depending on the requirements of the projector system and the quantity of defects present on the microdisplays.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A microdisplay projection system comprising:
a light source providing light input to a first input of a beam splitter, said beam splitter being functional to reflect a portion of the light input along a first axis and transmit a portion of the light input along a second axis, said beam splitter also being functional to selectively reflect light incoming along the first axis or transmit light incoming along the first axis to an output of the beam splitter and to selectively reflect light incoming along the second axis to an output of the beam splitter or transmit light incoming along the second axis;
a variable color filter disposed between the light source and the beam splitter;
a display screen disposed along the first axis,
a first LCoS chip disposed along the first axis, said first LCoS chip having a surface comprising a plurality of pixels being operable to reflect incident light and selectively change the polarity of the reflected incident light, said first LCoS chip aligned to reflect incident light back along the first axis, whereby a portion of said light will be transmitted along the first axis toward the display screen and a portion of said light will be reflected and lost;
a second LCoS chip disposed along the second axis, said second LCoS chip having a surface comprising a plurality of pixels being operable to reflect incident light and selectively change the polarity of the reflected incident, said second LCoS chip aligned to reflect incident light back along the second axis, whereby a portion of said light will be transmitted along the second axis and lost and a portion of said light will be reflected along the first axis toward the display screen;
a control system for controlling the operation of first LCoS chip and the second LCoS chip to alter the state of pixels thereon to selectively change the polarity of incident light reflected from the pixels to create an image on the display screen which corresponds to image data provided to the control system.

2. The microdisplay projection system of claim 1 wherein:
the control system is programmed to operate the first LCoS chip and the second LCoS chip such that each LCoS chip generally provides a portion of the illumination for the brightness of the display indicated in the image data.

3. The microdisplay projection system of claim 1 wherein:
the control system is programmed to operate the first LCoS chip and the second LCoS chip such that one LCoS chips provides substantially all the illumination for the brightness of the display indicated in the image data, and for each faulty pixel of that LCoS resulting in over or under illumination on the screen display, to control the other LCoS display to provide compensating additional illumination from a pixel or group of pixels on said other LCoS that correspond to the faulty pixel.

4. The microdisplay projection system of claim 1 wherein:
said control system is programmed to control one of the LCoS chips to selectively operate pixels to provide compensating illumination to the display screen to compensate for a defective pixel on the other LCoS chip.

5. The microdisplay projection system of claim 4 wherein:
the control system is programmed to operate the first LCoS chip and the second LCoS chip such that each LCoS chip generally provides a portion of the illumination for the brightness of the display indicated in the image data,
and for each faulty pixel of one LCoS resulting in over or under illumination on the screen display, to control the other LCoS display to provide compensating lesser or additional illumination from a pixel of group of pixels on said other LCoS that correspond to the faulty pixel.

* * * * *